United States Patent Office 3,370,008
Patented Feb. 20, 1968

3,370,008
METHYLOL REACTION PRODUCTS
Herbert S. Skovronek, Morris Plains, N.J., assignor to Texaco Inc., New York, N.Y., a corporation of Delaware
No Drawing. Original application Mar. 25, 1963, Ser. No. 267,792, now Patent 3,301,923, dated Jan. 31, 1967. Divided and this application June 8, 1966, Ser. No. 566,442
3 Claims. (Cl. 252—46.6)

The subject invention relates to novel reaction products of methylol compounds and hydrocarbonthiophosphonic acids. More particularly, the invention pertains to 2,2-dihydroxymethylalkyl hydrocarbonthiophosphonates. The invention also pertains to a method of manufacturing said thiophosphonates and to lubricant compositions thereof.

For purpose of simplicity, the 2,2-dihydroxymethylalkyl hydrocarbonthiophosphonates will be hereafter known as the methylol thiophosphonates.

The methylol thiophosphonates of this invention are represented by the following formula:

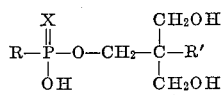

where R is a monovalent hydrocarbon radical, R' is hydrogen or an alkyl radical (saturated aliphatic hydrocarbon) from 1 to 10 carbon atoms, and X is a chalcogen selected from the group consisting of sulfur and a mixture of sulfur and oxygen.

Broadly, the methylol thiophosphonates of the invention are prepared by reacting hydrocarbonthiophosphonic acids with a 3-methyloloxetane.

*Preparation of the hydrocarbonthiophosphonic acid reactant*

Hydrocarbonthiophosphonic acid is derived from a hydrocarbon-$P_2S_5$ reaction porduct. As is well known, hydrocarbon-$P_2S_5$ reaction products are prepared by reaction of aromatic hydrocarbons, cycloaliphatic hydrocarbons, and aliphatic hydrocarbons with $P_2S_5$ at elevated temperatures. Although a wide variety of hydrocarbons such as aliphatic-substituted aryl compounds and aryl-substituted aliphatic compounds are unsable as the hydrocarbon reactant, olefins are generally employed. Lubricating oil fractions constitute another preferred class of materials for reaction with $P_2S_5$ to form a product which after further treatment as outlined below is converted to the methylol thiophosphonates.

The olefinic hydrocarbons reacted with $P_2S_5$ usually contain at least 12 carbon atoms although lower molecular weight olefins can be employed. Olefin polymers such as polyisobutylene, polybutylene, polypropylene and copolymers of olefins such as propylene-isobutylene copolymer are particularly preferred materials for reaction with $P_2S_5$. In general monoolefin polymers and copolymers (alkenes) having an average molecular weight between about 250 and 50,000 are employed with polymers and copolymers having an average molecular weight in the range from about 600 to 5,000 being preferred. Copolymers of conjugated dienes and monoolefins such as copolymer of butadiene and isobutylene having an average molecular weight in the above prescribed range also react with $P_2S_5$. Particularly preferred olefin polymers are polybutene polymers having an average molecular weight between 600 and 5,000.

The reaction product obtained by reacting $P_2S_5$ with hydrocarbon (the $P_2S_5$ constituting 5 to 40 wt. percent of the reaction mixture) at a temperature from about 100–320° C. in a non-oxidizing atmosphere, for example, under a blanket of nitrogen, is hydrolyzed at a temperature between about 100 and 260° C. by contact with steam. Steam treatment hydrolyzes the hydrocarbon-$P_2S_5$ reaction product to a hydrocarbonthiophosphonic acid and inorganic phosphorus acids. The hydrocarbonthiophosphonic acid has the general formula:

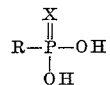

wherein R is derived from the charged hydrocarbon and usually a polyolefin radical (alkenyl) containing 20 to 200 carbon atoms. X is sulfur or a mixture of oxygen and sulfur. X in the above formula is designated as sulfur or a mixture of sulfur and oxygen because the steam hydrolysis step usually results in replacement with oxygen of a portion of the sulfur joined to phosphorus.

The inorganic phosphorus acids formed during hydrolysis are removed prior to reaction with the alkylene oxides. A number of different procedures are available for removal of the inorganic phosphorus acids. In the U.S. Patents Nos. 2,951,835 and 2,987,512 removal of the inorganic phosphorus acids is effected by contact with synthetic hydrous alkaline earth metal silicates and synthetic hydrous alkali metal silicates, respectively. Commonly-assigned copending application Serial No. 841,668, filed Sept. 23, 1959, by H. D. Kluge and R. G. Lacoste describes a process wherein inorganic phosphorus acids are removed from the hydrolyzed product by extraction with anhydrous methanol.

Specific examples of thiophosphonic acids contemplated herein are polybutene(1100 m.w.)thiophosphonic acid, polyisobutylene(1500 m.w.)thiophosphonic acid, polypropylene(2500 m.w.)thiophosphonic acid and polyisobutylene(800 m.w.)thiophosphonic acid.

*Methyloloxetane reactant*

The methyloloxetane reactants which are contemplated herein to react with the hydrocarbonthiophosphonic acids to form the novel methylol thiophosphonates of this invention are represented by the formula:

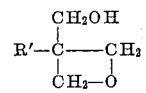

where R' is an alkyl group of from 1 to 10 carbons or hydrogen. Specific examples of the methyloloxetanes contemplated herein are 3-methyloloxetane, 3-ethyl-3-methyloloxetane, 3-isobutyl - 3 - methyloloxetane, 3-propyl-3-methyloloxetane and 3-hexyl-3-methyloloxtane.

One method of preparing the methylol reactant is reacting a trimethylolalkane with a dialkyl carbonate in the presence of a base catalyst under elevated temperature. This reaction is further described in J. Am. Chem. Soc. 79, 3455 (1957).

*Preparation of the thiophosphonates of the invention*

Broadly, the preparation of the methylol thiophosphonates of the invention may be described by the following equation:

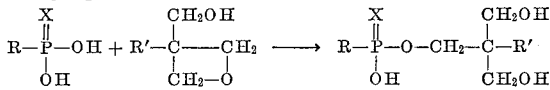

where R, R' and X are as heretofore defined.

Reaction of the methyloloxetane with the hydrocarbonthiophosphonic acid to produce the novel methylol thiophosphonates of the invention is effected at a temperature of between 80 and 200° C., preferably between 110 and 130° C., and at essentially atmospheric pressure although superatmospheric and subatmospheric pressures may be employed.

The mole ratio of methyloloxetane to thiophosphonic acid in the reaction mixture is advantageously between about 0.1:1 and 10:1, desirably between 1:1 and 4:1.

Specific examples of the methylol thiophosphonates in addition to the one described in subsequent examples are 2,2 - dihydroxymethylbutyl polyisobutylene (1500 m.w.) thiophosphonate; 2,2-dihydroxymethylpropyl polypropylene (2500 m.w.) thiophosphonate; 2,2-dihydroxymethylhexyl isobutylene-propylene copolymer (2000 m.w.) thiophosphonate and 2,2-dihydroxymethylethyl polypentylene (4000 m.w.) thiophosphonate.

*Lubricant compositions of the novel methylol thiophosphonates*

In lubricant compositions, the methylol thiophosphonates of the invention are present in the lubricating oil in concentrations sufficient to impart detergent and dispersant properties thereto. Advantageously, in finished lubricants, the methylol thiophosphonates are usually present in the concentration between about 0.2 and 10 wt. percent desirably between 1 and 5 wt. percent. In concentrates used in the formation of the finished lubricants, the concentration of the thiophosphonates can be as high as 50 wt. percent.

Hydrocarbon mineral oils are usable as base oils in the contemplated lubricants. They can be paraffin base, naphthene base, or mixed paraffin-naphthene base distillate or residual oils. Paraffin base distillate lubricating oil fractions are used in formulation of premium grade motor oils such as are contemplated herein. The lubricating base oils generally have been subjected to solvent refining to improve their lubricity and viscosity-temperature relationship as well as solvent dewaxing to remove waxy components and improve the pour of the oil. Broadly speaking, mineral lubricating oils having an SUS viscosity at 100° F. between 50 and 1,000 may be used in the formulation of the improved lubricants of this invention but usually the SUS viscosity range falls between 70 and 300 at 100° F.

The mineral lubricating oils containing the thiophosphonates of the invention can also contain other additives designed to impart additional desirable properties thereto. For example, V.I. improvers such as the polymethacrylates are normally included therein as are corrosion inhibitors and other detergents.

A widely used V. I. improver is a polymethyacrylate of the general formula:

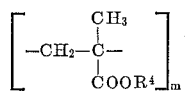

wherein $R^4$ is an aliphatic radical, e.g., from 1 to 20 carbons and $m$ is an integer of between 600 and 35,000.

Another supplementary additive is the detergent alkaline earth metal alkylphenolates. Barium nonylphenolate, barium dodecylcresolate and calcium dodecylphenolate are examples of such detergents. These products are usually present in the lubricating oil in a concentration between 0.1 and 5 wt. percent.

Still another supplementary additive is divalent metal dialkyl dithiophosphate resulting from the neutralization of a $P_2S_5$-alcohol reaction product with a divalent metal or divalent metal oxide. This additive acts as an antioxidant and corrosion inhibitor. Barium and zinc dialkyl dithiophosphates are the most widely used. Metal dialkyl dithiophosphates are usually present in the lubricant in a concentration between 0.1 and 3 wt. percent.

Synthetic ester or ether oils may be alternatively used as the base lubricant. High molecular weight, high boiling liquid aliphatic dicarboxylic acid esters possess excellent viscosity-temperature relationships and lubricating properties and are finding ever-increasing utilization in lubricating oils adapted for high and low temperature lubrication. Esters of this type are used in the formulation of jet engine oils.

The following examples further illustrate the invention but are not to be taken as a limitation thereof. Example I illustrates the preparation of the hydrocarbonthiophosphonic acid reactant. Example II demonstrates the preparation of the oxetane reactant. Example III demonstrates the preparation of the methylol thiophosphonate from the hydrocarbonthiophosphonic acid of the type prepared in Example I and the oxetane prepared in Example II. Example IV illustrates the lubricating additive properties of the methylol thiophosphonates and the lubricant compositions thereof.

EXAMPLE I

A polybutene-$P_2S_5$ reaction product was prepared by reacting polybutene having an average molecular weight of about 1100 with the $P_2S_5$ in a mole ratio of polybutene to $P_2S_5$ of 1:1 and in the presence or sulfur in an amount equal to 1.3 wt. percent of polybutene at 232° C. The reaction was continued until the reaction mixture was soluble in n-pentane. The reaction product was diluted with approximately 150 wt. percent of a naphthene base oil having an SUS viscosity at 100° F. of 100, steamed at 176° C. for 10 hours in a nitrogen atmosphere and then dried by passage of nitrogen therethrough at 176° C. The hydrolyzed (steamed) product was extracted with 50% volume of methyl alcohol at 60° C. to give a methanol extract containing inorganic phosphorus acids and a lubricating oil raffinite containing polybutene (1100 m.w.) thiophosphonic acid which after stripping free of methanol had a Neut. No. (neutralization number) of 22.6.

The theoretical amount of sulfur based on Neut. No. for a structure in the raffinite of the formula:

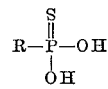

where R is a polybutene radical of an average molecular weight of 1100 is 1.29 wt. percent. The percent sulfur found in the raffinite containing the thiophosphonic acid product was 0.51 wt. percent indicating said product is of the formula:

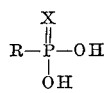

where X is a mixture of sulfur and oxygen and R is as heretofore defined.

EXAMPLE II

Two hundred thirty six grams (2 moles) of trimethylolpropane, 268 (2 moles) diethylcarbonate and 0.1 gram potassium hydroxide in absolute alcohol was charged to a flask. The mixture was heated to reflux (105° C.) and refluxed for 2 days. The reaction mixture was distilled and the product collected over 85–145° C. at 20 mm./Hg. The crude product was redistilled at a pressure less than 2 mm./Hg. and 246 grams of distillate boiling at 82–86° C. at 2 mm./Hg. were obtained having and $N_d^{20.5}$ of 1.4524. The product was identified as 3-ethyl-3-methyloloxetane.

EXAMPLE III

Polybutene (1100 m.w.) thiophosphonic acid oil solution as prepared in Example I in the amount of 496 grams (0.15 mole based on Neut. No.) was charged to a flask equipped with a stirrer, dropping funnel and thermometer. The thiophosphonic acid was heated to 121° F. and 35 grams (0.3) mole of 3-ethyl-3-methyloloxetane of the type prepared in Example II was added dropwise. The reaction mixture was maintained at 121° C. for an additional hour. The Neut. No. of the product was 3.84, an additional 9 grams of the oxetane was added to the product and the mixture heated at 121° C. for an hour and a half. The Neut. No. of the final product was 2.2 and it was identified as 2,2-dihydroxymethylbutyl hydrocarbon (1100 m.w.) thiophosphonate in an oil solution of the formula:

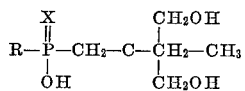

where R is a polybutene radical (monoolefinic) of an average molecular weight of 1100 and X is a mixture of sulfur and oxygen.

Analysis of the thiophosphonate product found the following:

TABLE I

| Analysis | Calculated | Found |
| --- | --- | --- |
| Sulfur, wt percent | *1.2 | 046 |
| Phosphorus, wt. percent | 1.1 | 1.0 |
| OH No | 44 | 70 |
| Neut. No | 0 | 2.2 |

*Based on X=100% sulfur in above formula.

EXAMPLE IV

This example illustrates the detergent dispersant properties of the methylol thiophosphonates of the invention. An SAE 10W-30 motor oil containing the methylol thiophosphonate product of Example IV as the detergent dispersant additive is of the following formulation:

TABLE II

| Description | Concentration, wt. percent |
| --- | --- |
| Refined paraffinic distillate oil wt. percent (SUS visc. at 100° F.=100) | 88.13 |
| Methylol thiophosphonate raffinite product of Example III | 3.60 |
| Barium C$_{12}$ alkylphenolate | 1.79 |
| Zinc isopropyl 1,3-dimethylbutyl dithiophosphate | 0.82 |
| Mineral oil concentrate containing 25 wt. percent of a copolymer of mixed methacrylate alkyl esters in which the alkyl groups range from butyl to octadeyl | 5.00 |
| CO$_2$ neutralized basic barium sulfonate | 0.66 |
| | P.p.m. |
| Dimethylsilicone antifoam concentrate | 150 |
| Viscosity kinematic | |
| At 100° F. | 58.3 |
| At 210° F. | 9.94 |

The above lubricant composition was tested in the CLR Sludge Engine Test together with a Control, that is, the composition of Table II minus the methylol thiophosphonate ingredient. The results are as follows:

*CLR SLUDGE ENGINE TEST RESULTS

| Description | Hours | | | | |
| --- | --- | --- | --- | --- | --- |
| | 38 | 54 | 70 | 94 | 110 |
| Sludge Rating of Composition of Table II | | 9.6 | 9.2 | 7.6 | 7.2 |
| Sludge Rating of Control | 6.9 | 5.4 | | | |

*Sludge-free oil rating =10.

As can be seen from the above data, the methylol thiophosphonates of the invention are effective detergent-dispersant additives in lube oils.

I claim:
1. A lubricating oil containing a methylol thiophosphonate in amounts sufficient to impart detergent dispersant properties thereto, said methylol thiophosphonate having the formula:

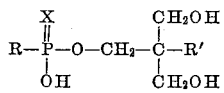

where R is an aliphatic polyolefin radical having an average molecular weight between 250 and 50,000, R' is selected from the group consisting of a saturated aliphatic hydrocarbon of from 1 to 10 carbons and hydrogen, and X is a chalcogen selected from the group consisting of sulfur and a mixture of sulfur and oxygen.

2. A lubricating oil in accordance with claim 1 wherein said thiophosphonate is present in an amount between 0.2 and 10 wt. percent and said lubricating oil is a paraffinic lubricating oil having an SUS viscosity at 100° F. between about 70 and 300.

3. A lubricating oil in accordance with claim 2 wherein R is a polybutene radical having an average molecular weight of about 1100, R' is ethyl and X is a mixture of sulfur and oxygen.

References Cited

UNITED STATES PATENTS 3,201,438   8/1965   Reed et al. _____ 252—46.6 X
3,256,190   6/1966   Reed et al. _____ 252—46.6 X DANIEL E. WYMAN, Primary Examiner.

W. H. CANNON, Assistant Examiner.